US010108082B1

(12) United States Patent
Hoth

(10) Patent No.: US 10,108,082 B1
(45) Date of Patent: Oct. 23, 2018

(54) PERSISTENCE OF VISION ARTICLE HAVING A SEMI-RIGID ELEMENT SHAFT

(71) Applicant: Christopher F. Hoth, Gales Ferry, CT (US)

(72) Inventor: Christopher F. Hoth, Gales Ferry, CT (US)

( * ) Notice: Subject to any disclaimer, the term of this patent is extended or adjusted under 35 U.S.C. 154(b) by 0 days.

(21) Appl. No.: 15/157,525

(22) Filed: May 18, 2016

Related U.S. Application Data

(60) Provisional application No. 62/163,714, filed on May 19, 2015.

(51) Int. Cl.
*G09G 3/00* (2006.01)
*G03B 25/00* (2006.01)

(52) U.S. Cl.
CPC .................................... *G03B 25/00* (2013.01)

(58) Field of Classification Search
CPC ..................................................... G03B 25/00
See application file for complete search history.

(56) References Cited

U.S. PATENT DOCUMENTS 5,406,300 A 4/1995 Tokimoto et al.
5,670,971 A 9/1997 Tokimoto et al.
5,748,157 A 5/1998 Eason
6,239,774 B1 5/2001 Altman
6,249,998 B1 6/2001 NakaMats
6,265,984 B1 * 7/2001 Molinaroli ............ A63H 33/40 340/815.4
6,486,858 B1 11/2002 Altman
6,894,663 B1 5/2005 Altman
8,866,703 B2 10/2014 Weiss et al.
2003/0080924 A1 5/2003 Bentley
2003/0227425 A1 12/2003 McKay et al.
2009/0176545 A1 * 7/2009 Civettini .................. A63F 9/02 463/7

FOREIGN PATENT DOCUMENTS

JP 2000330496 11/2000

* cited by examiner

*Primary Examiner* — Jonathan Boyd
(74) *Attorney, Agent, or Firm* — Steven M. McHugh

(57) ABSTRACT

A persistence of vision device is provided and includes an element shaft, wherein the element shaft includes shaft front surface and a shaft length, and wherein the element shaft is flexible in a sagittal plane. The device further includes at least one light source, wherein the at least one light source is associated with the shaft front surface and extends along a portion of the shaft front surface length and a processing device, wherein the processing device is communicated with the at least one light source to control the operation of the at least one light source. Furthermore, the device includes a displacement device having a displacement device shaft movable in the coronal plane, wherein the element shaft is connected to the displacement device shaft such that the element shaft is movable in the coronal plane.

20 Claims, 11 Drawing Sheets

Section A-A

PERSISTENCE OF VISION ARTICLE HAVING A SEMI-RIGID ELEMENT SHAFT

RELATED APPLICATIONS

This application claims benefit of U.S. Provisional Patent Application Ser. No. 62/163,714, filed May 19, 2015, the contents of which are incorporated by reference herein in its entirety.

FIELD OF THE INVENTION

This invention relates generally to persistence of vision articles and more particularly a persistence of vision article having a semi-rigid flexible pendulum.

BACKGROUND OF THE INVENTION

Persistence of vision (POV) units are well known and are used for producing a wide variety of visual effects. These POV units are used in a variety of ways, such as table top units and/or as hat mounted units. These units operate on the principal of an optical phenomenon called “persistence of vision” and a psychological phenomenon called “the phi phenomenon” which is the tendency of the mind to complete the gaps between frames or pictures. Typically, a POV unit includes a rod that has one or more light elements, wherein the rod repeatedly moves through a space (i.e. back and forth movement or via rotation movement). As the rod moves through the space, the light elements light up in a predefined manner to create an image.

Unfortunately, the rods in these units are very rigid structures and depending on the application use, may be injurious to a wearer or a bystander. For example, one use for these POV units is on baseball hats where the hats are worn at sporting events, concerts and other events. In this use, the rods that contain the light elements are configured to swing side to side (in pendulum fashion). However, in order for the POV units to operate correctly, the rod should be rigid because moving from side to side at the necessary speed will cause bending which will end up distorting the image. This image distortion is undesirable. Additionally, with these types of devices, adult and kid bystanders tend to ‘play’ with the rod as it is moving side to side. Because these rods are rigid and don’t bend, this can result in injuries to the bystanders, such as the hands, eyes, etc.

SUMMARY OF THE INVENTION

In one embodiment a Persistence Of Vision (POV) device is provided, wherein the persistence device includes a coronal plane and a sagittal plane. The device includes an element shaft, wherein the element shaft includes a shaft front surface having a shaft front surface length, wherein the element shaft is flexible in the sagittal plane. The device further includes a plurality of light sources, wherein the plurality of light sources are associated with the shaft front surface and distributed along the shaft front surface length and a processing device, wherein the processing device is communicated with the plurality of light sources to control the operation of the plurality of light sources. Additionally, the device includes a displacement device having a displacement device shaft movable in the coronal plane, wherein the element shaft is connected to the displacement device shaft such that the element shaft is movable in the coronal plane and a device base, wherein the device base defines a base cavity for containing the processing device, the displacement device and a portion of the element shaft, wherein the device base includes a device base opening communicated with the base cavity.

In an additional embodiment a persistence of vision device is provided and includes an element shaft, wherein the element shaft includes shaft front surface and a shaft length, and wherein the element shaft is flexible in a sagittal plane. The device further includes at least one light source, wherein the at least one light source is associated with the shaft front surface and extends along a portion of the shaft front surface length and a processing device, wherein the processing device is communicated with the at least one light source to control the operation of the at least one light source. Furthermore, the device includes a displacement device having a displacement device shaft movable in the coronal plane, wherein the element shaft is connected to the displacement device shaft such that the element shaft is movable in the coronal plane.

In still yet another embodiment, a Persistence Of Vision (POV) device is provided, wherein the persistence device includes a coronal plane and a sagittal plane. The device includes an element shaft, wherein the element shaft includes a shaft front surface having a shaft front surface length, wherein the shaft front surface is arcuate in shape along the shaft front surface length and wherein the element shaft is flexible in the sagittal plane. The device includes a plurality of light sources, wherein the plurality of light sources are associated with the shaft front surface and distributed along the shaft front surface length and a processing device, wherein the processing device is communicated with the plurality of light sources to control the operation of the plurality of light sources. Additionally, the device includes a displacement device having a displacement device shaft movable in the coronal plane, wherein the element shaft is connected to the displacement device shaft such that the element shaft is movable in the coronal plane.

BRIEF DESCRIPTION OF THE DRAWINGS

The foregoing and other features and advantages of the present invention will be more fully understood from the following detailed description of illustrative embodiments, taken in conjunction with the accompanying drawings in which like elements are numbered alike.

DETAILED DESCRIPTION OF THE INVENTION

Figure 1:
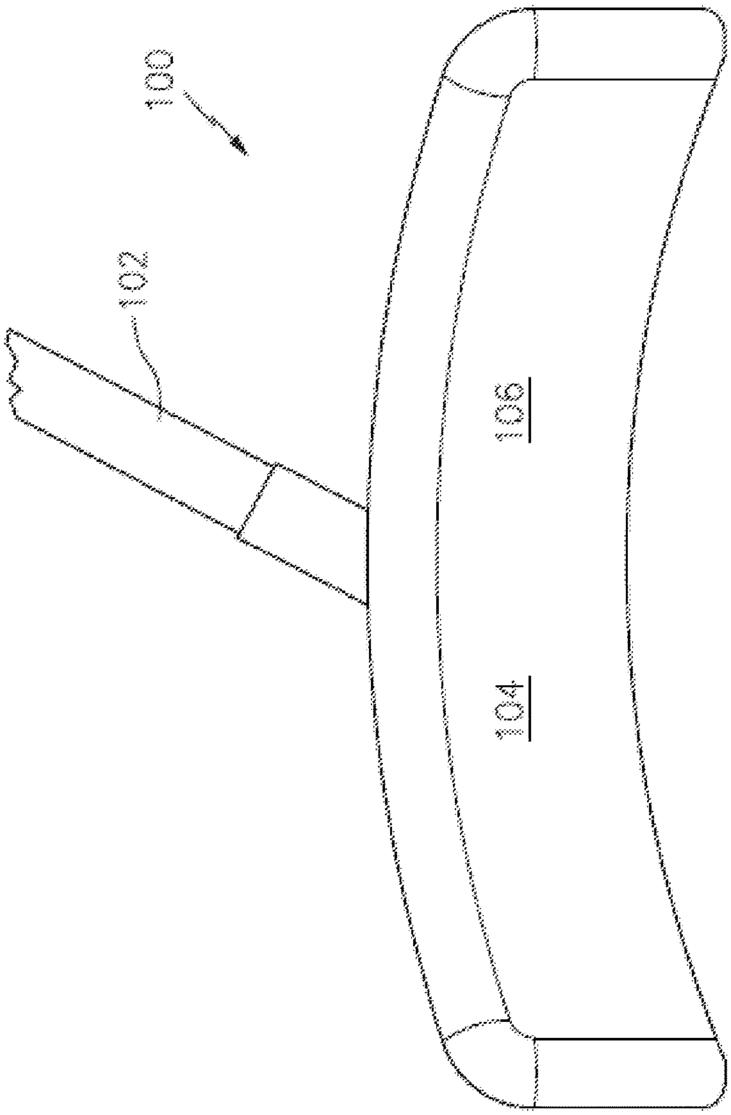
FIG. 1 is a front view of a POV unit having a flexible element shaft, in accordance with one embodiment of the invention.
Figure 2:
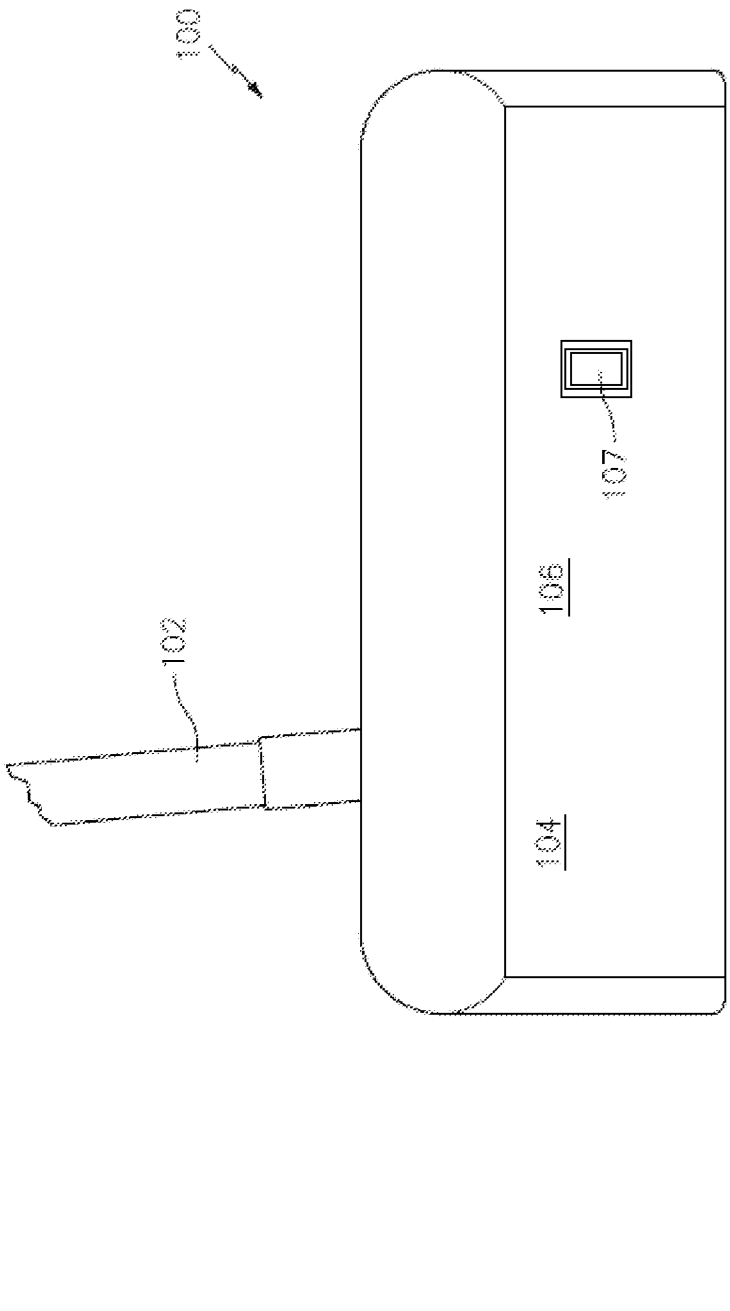
FIG. 2 is a left side view of the POV unit of FIG. 1 having a flexible element shaft.
Figure 3:
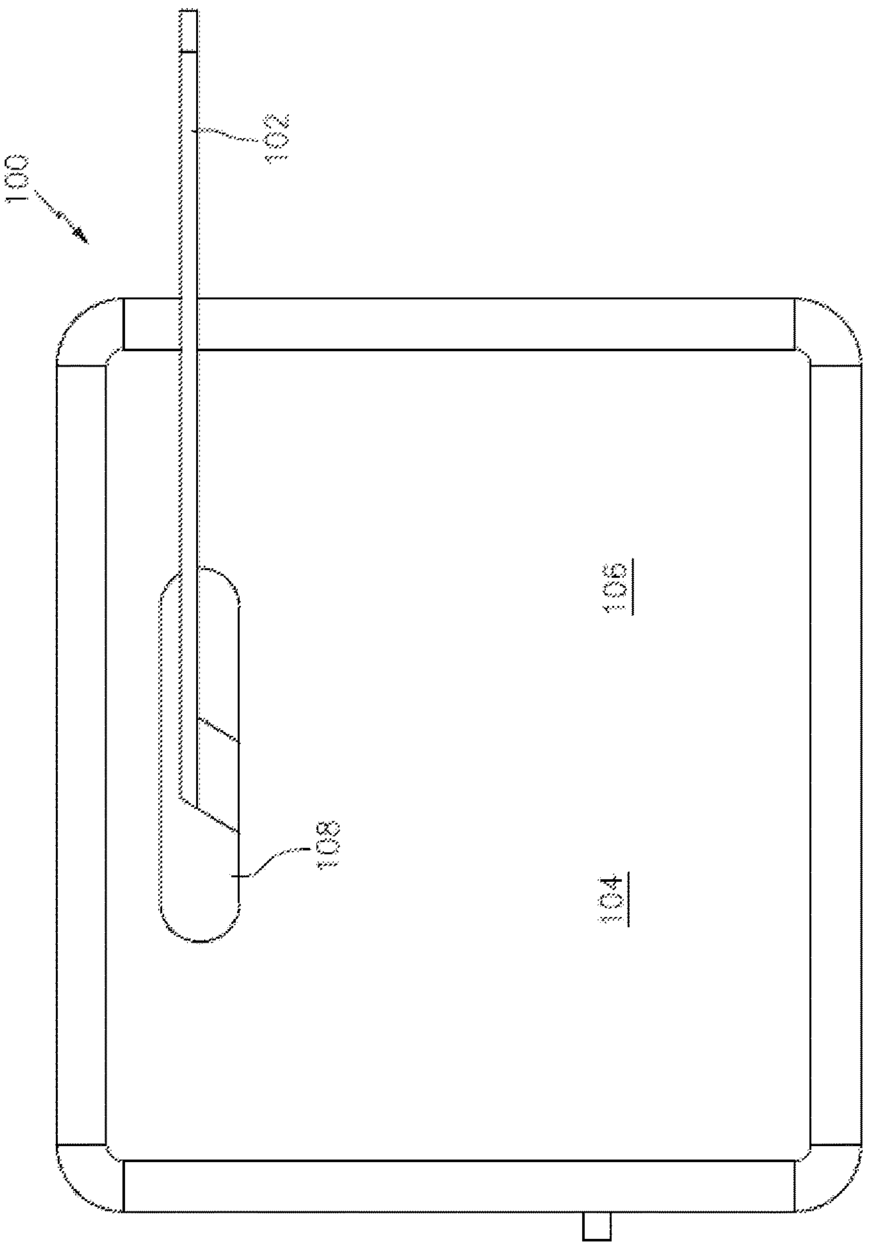
FIG. 3 is a top down view of the POV unit of FIG. 1 having a flexible element shaft.

As disclosed herein with regards to an exemplary embodiment, a POV unit having a semi-rigid element shaft is provided in accordance with one embodiment of the invention. The present invention provides for a more robust and safer POV unit by advantageously incorporating a rod that is rigid in the coronal direction (Plane), but flexible in the sagittal direction (plane). Accordingly, if the element shaft is pressed on, the element shaft will flex without breaking and return to its original orientation.

Referring to FIG. 1, FIG. 2, FIG. 3 and FIG. 4A, a POV unit 100 having a flexible element shaft 102 and a control article 104 is shown in accordance with one embodiment of the invention. The control article 104 includes an article outer structure 106, wherein the outer structure 106 defines a shaft opening 108 and an article cavity 110. The control article 104 further includes a processing device 112 (such as a microcontroller) having control circuitry, a displacement device 114 and a power source 116, such as a plurality of batteries, wherein the processing device 112, displacement device 114 and power source 116 are located within the article cavity 110. It should be appreciated that the element shaft 102 is associated with the displacement device 114 and the element shaft 102 and displacement device 114 are arranged such that the element shaft 102 is protruding out of the shaft opening 108. Thus, when the displacement device 114 is operated, the element shaft 102 moves within the shaft opening 108 in a side-to-side fashion. It should be appreciated that the control article 104 includes an on/off switch 107 to connect/disconnect power to the processing device 112 and displacement device 114

Figure 4A:
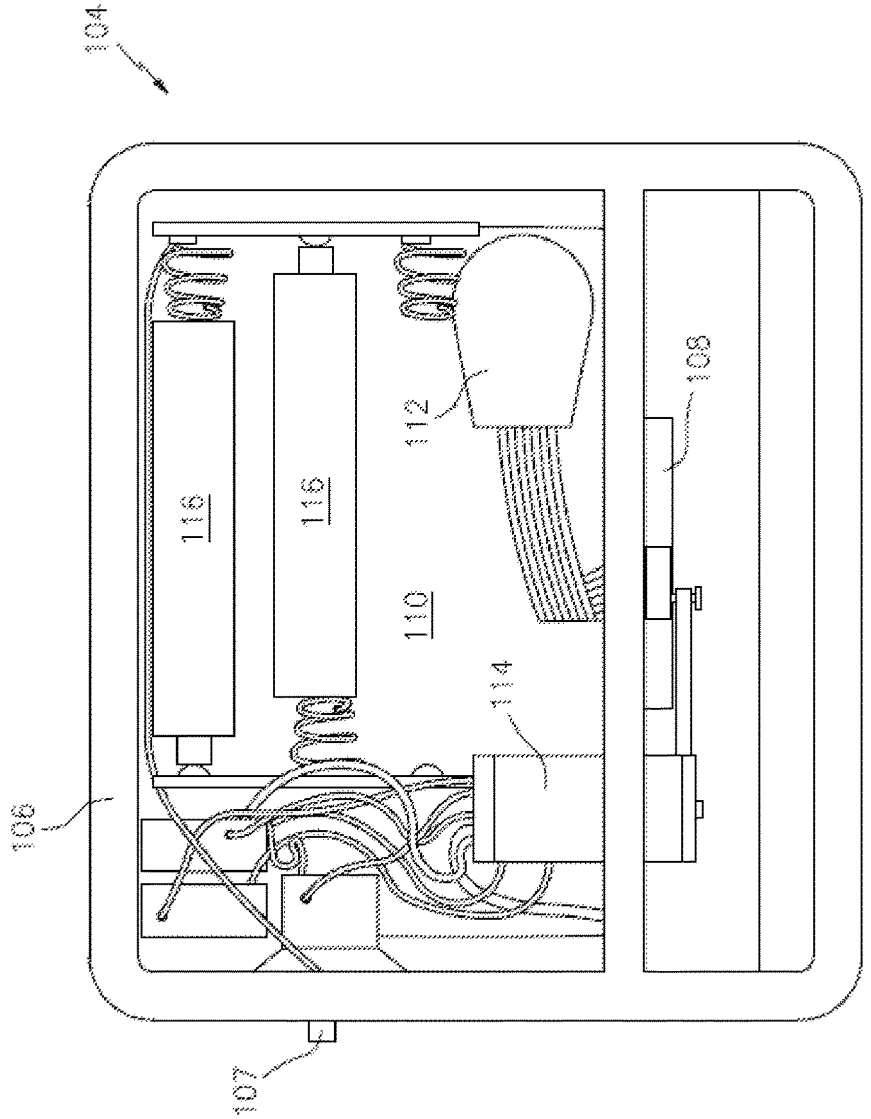
FIG. 4A is a bottom up view of the POV unit of FIG. 1 having a flexible element shaft.
Figure 4B:
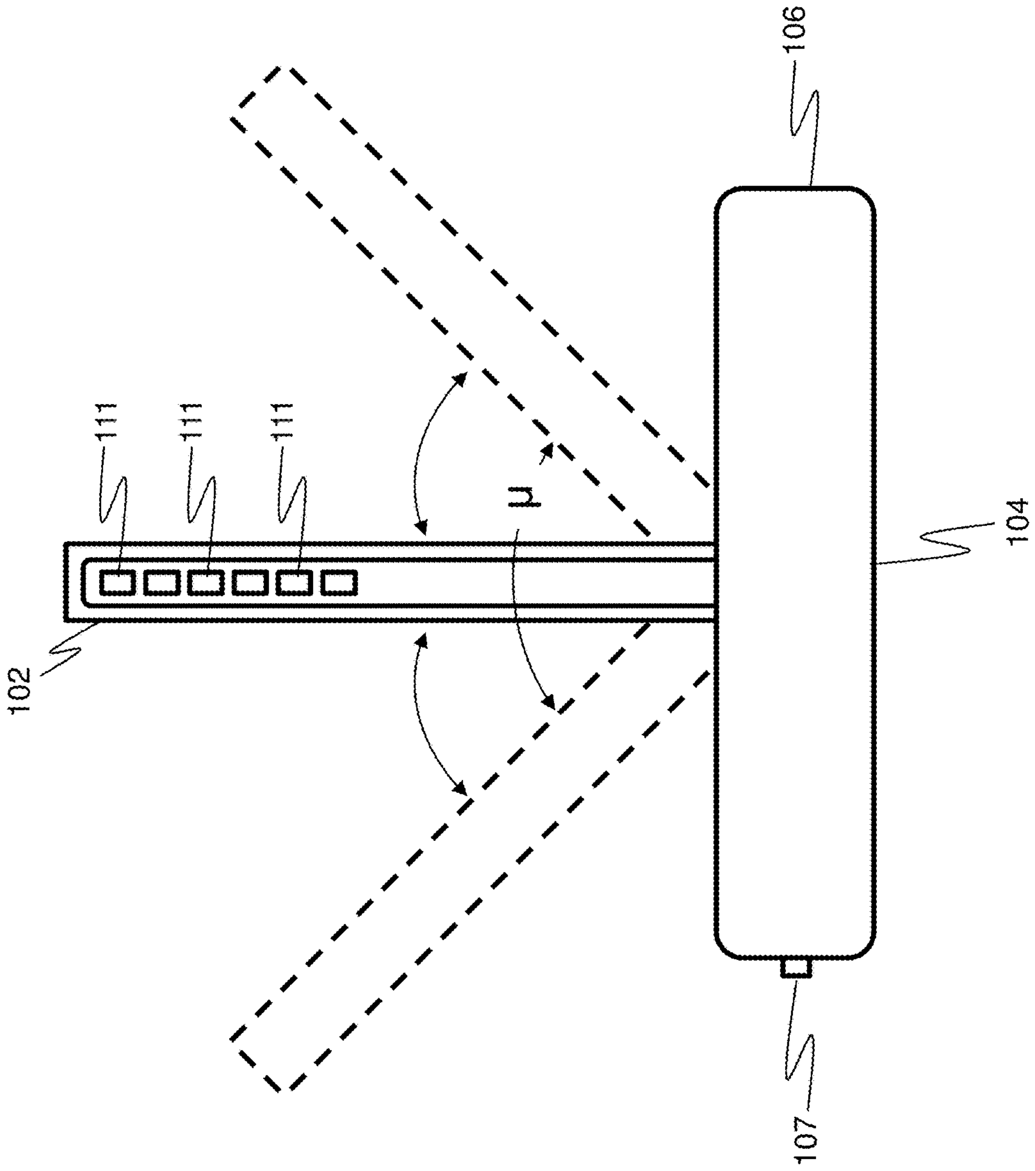
FIG. 4B is a front view of the POV unit of FIG. 1 illustrating the side-to-side movement of the flexible element shaft during operation.

It should be further appreciated that the element shaft 102 includes one or more light elements 111 (such as LED's) that are controllably operable. As such, the processing device 112 is associated with the displacement device 114 and/or the element shaft to control the movement of the element shaft 102 and the functionality of the light elements 111 contained thereon. Referring to FIG. 4B, a front view of the POV unit 100 is shown and illustrates the side-to-side movement of the element shaft 102 during operation. It should be appreciated that during this side-to-side movement the element shaft 102 moves through a sweep angle μ. It should be appreciated that in one embodiment, the sweep angle may be between about 75 degrees and about 165 degrees, ±10 degrees. However, the sweep angle may be any sweep angle μ suitable to the desired end purpose. For example, in one embodiment the sweep angle μ may be about 130 degrees. In other embodiments, the sweep angle μ may be about 150 degrees, as desired. It should be further appreciated that the LED's 111 located on the element shaft 102 may be configured to light up relative to the location of at least one of the element shaft 102 and the LED's 111 in the coronal plane during operation to form an image or word.

Figure 5:
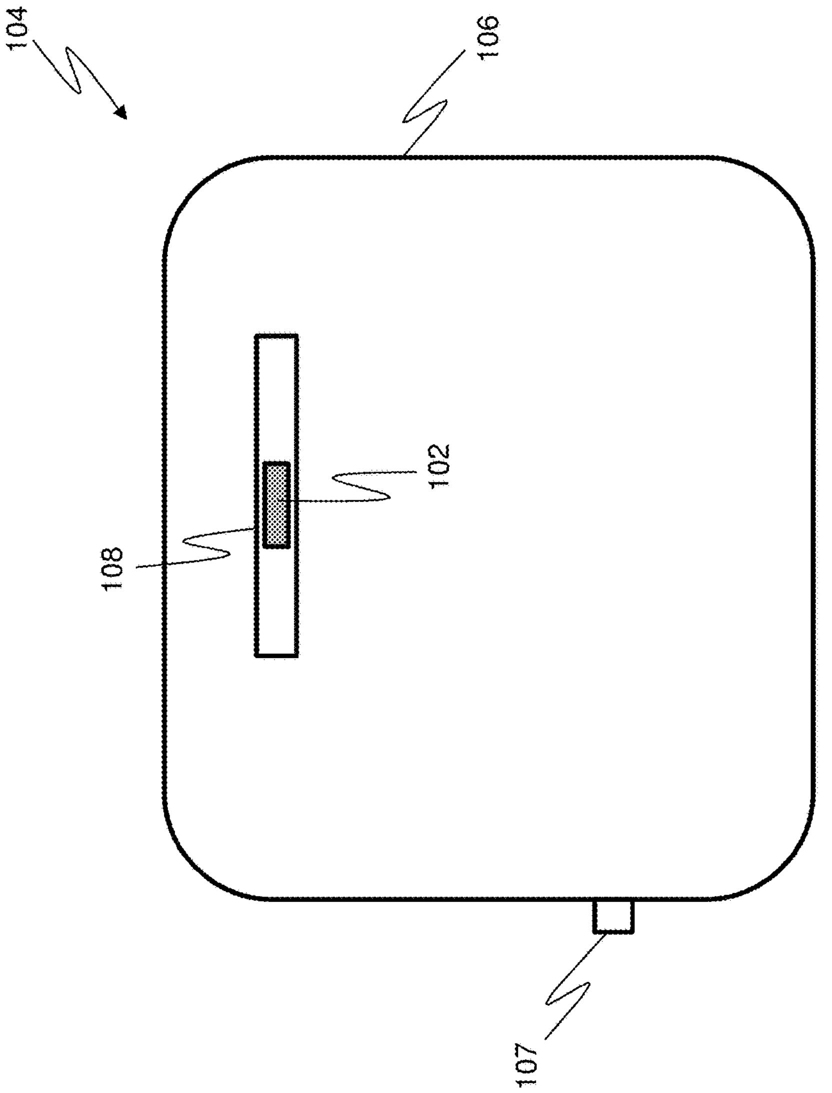
FIG. 5 is a top down view of the POV unit of FIG. 1 having a flexible element shaft.
Figure 6:
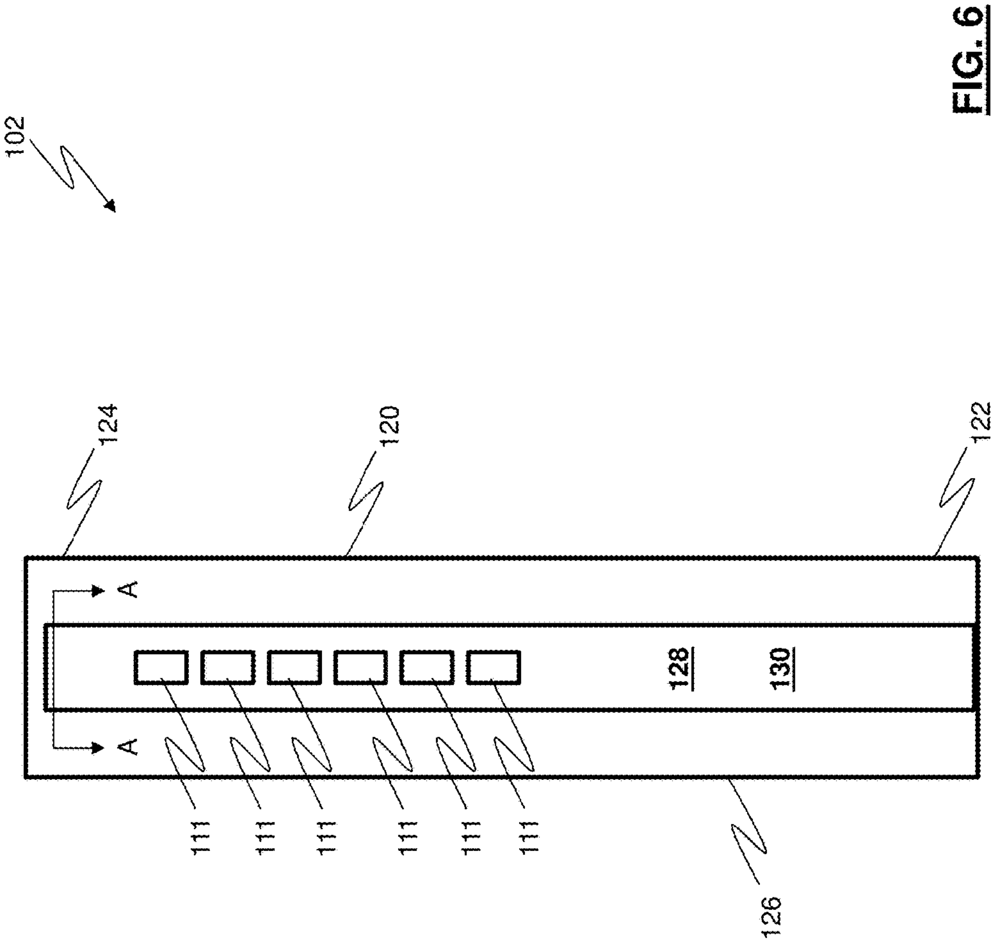
FIG. 6 is a front view of the flexible element shaft used with the POV unit of FIG. 1.
Figure 7A:
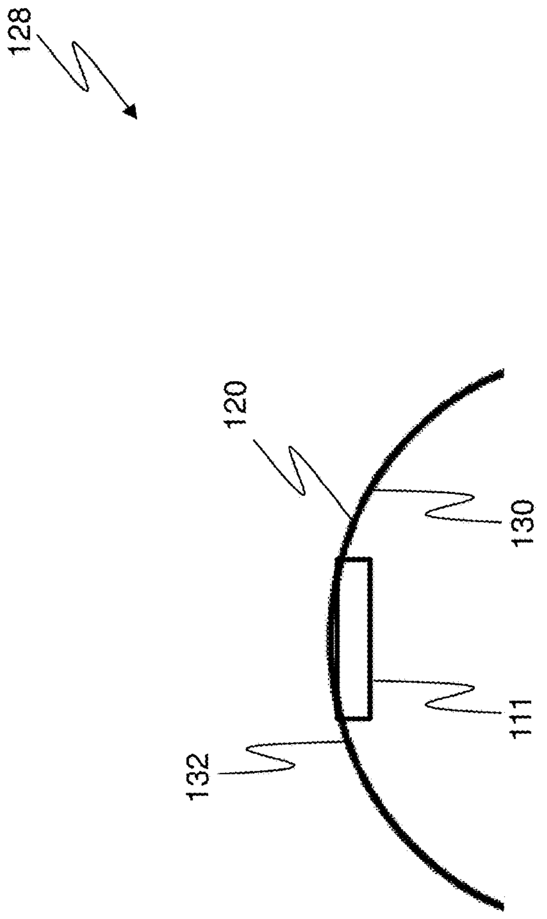
FIG. 7A is a top down sectional view of the flexible element shaft of FIG. 6.

Referring to FIG. 5, FIG. 6 and FIG. 7A, the element shaft 102 is shown in accordance with one embodiment of the invention, wherein the element shaft 102 includes a shaft body 120, a shaft body base 122 and a shaft body top 124. It should be appreciated that the shaft body 120 may include an outer cover 126 and an inner shaft structure 128, wherein the inner shaft structure 128 is arcuate in shape to resemble a crescent shape and the outer cover 126 protects the shaft body 120. The inner shaft structure 128 includes an inner shaft structure front 130 having an inwardly curving (or concave) surface and an inner shaft structure rear 132 having an outwardly curving (or convex) surface. The light elements 111 are affixed to (or integrated with) the inner shaft structure front 130 proximate the shaft body top 124. The inner shaft structure 128 extends between the shaft body base 122 and the shaft body top 124 and electrical traces that connect the light elements 111 to the power source 116 and/or processing device 112 run along the shaft body 120 (via a flexible circuit) to the shaft body base 122, wherein the shaft body 120 is connected to the displacement device 114. It should be further appreciated that, in other embodiments, the shaft body 120 may be constructed from a single structure and may not include an outer cover and may only include the inner shaft structure 128. Additionally, it is contemplated that the radius of the inner shaft structure 128 may be any radius suitable to the desired end purpose.

It should be appreciated that at least one of the shaft body 120 and the inner shaft structure 128 of the element shaft 102 may be constructed from any material suitable to the desired end result that provides for a rigid structure that may maintain a desired amount of rigidity in the coronal plane (i.e. side to side) but that may be somewhat flexible in the sagittal plane (i.e. front to back), such as, for example, a plastic polymer material (i.e. polypropylene, etc). Additionally, the outer cover 126 may be constructed from any material suitable to the desired end purpose, such as a plastic material (i.e. plastic film, polyester, polypropylene, etc.).

Figure 7B:
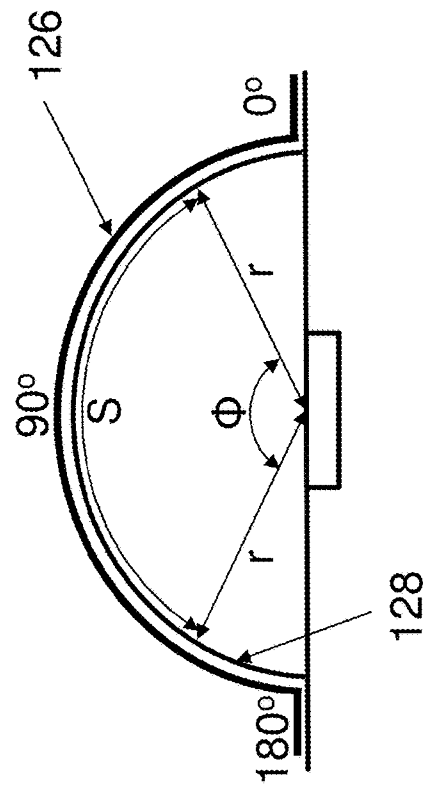
FIG. 7B is a top down sectional view of a flexible element shaft showing the outer cover and the inner shaft structure, in accordance with one embodiment of the invention.

Additionally, the electrical traces are connected to the power source 116 and/or processing device 112. The arcuate shape of the inner shaft structure 128 advantageously allows the element shaft 102 to flex in the sagittal plane (i.e. front to back), but limits flexibility in the coronal plane (i.e. side to side). Referring to FIG. 7B, it should be appreciated that in one embodiment, the arcuate shape of at least one of shaft body 120 and the inner shaft structure 128 may have an arc ϕ of about 120 degrees (±10 degrees) which would include an arc radius length S of about 4 mm. However, it is contemplated that in additional embodiments the arc ϕ of at least one of shaft body 120 and the inner shaft structure 128 may be any arc ϕ desired. Essentially, if the arc ϕ of at least one of shaft body 120 and the inner shaft structure 128 is a full 180 degrees, the element shaft 102 will achieve the most stability in the sagittal direction (plane). This advantageously prevents the shaft element 102 from flexing 'too much' in the coronal plane as too much flexing will distort the image generated from the POV unit 100. Additionally, flexing in the coronal plane may cause the electrical leads to the light elements 111 to break or become disconnected. However, flexing in the sagittal plane will not create too much distortion because the bending will typically occur proximate the middle of the shaft element 102 and thus distortion will be minimized.

Figure 8:
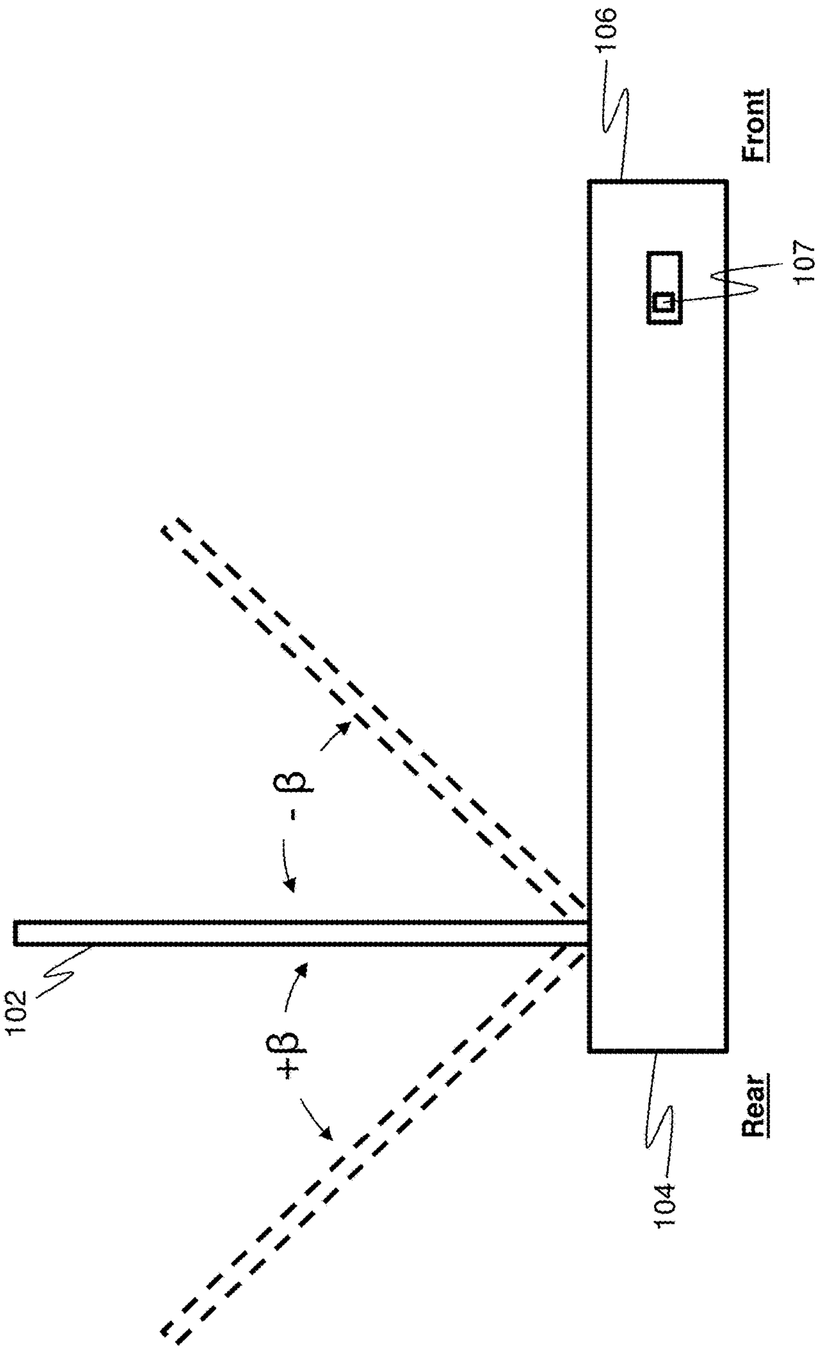
FIG. 8 is a left view of the POV unit of FIG. 1 illustrating the deflection angle of the flexible element shaft, in accordance with one embodiment of the invention.

It should be appreciated that in one embodiment, at least a portion of the flexible element shaft 102 includes a flexible circuit upon (and/or within) which the electrical traces are located, wherein the flexible circuit may be constructed from polyimide material having copper laminate for traces. It should be appreciated that the flexible element shaft 102 and the control article 104 may be any size suitable to the desired end purpose, such as, for one example, being sized and configured to fit and clip onto the brim of a baseball hat. In one embodiment the element shaft 102 may be approximate 5 inches to 6 inches long, and approximately ¼ inch wide and the control article 104 may be approximately 3 inches in length, approximately 2¼ includes in width and approximately 1 inch in height. Referring to FIG. 8, the deflection angle β of the element shaft 102 (in the sagittal plane) during operation may be any angle suitable to the desired end purpose. For example, in one embodiment the deflection angle β may be about 20 degrees (±5 degrees) (i.e. ±β), from the upright perpendicular position.

Additionally, the flexible element shaft 102 may include any number of electrical traces, suitable to the desired end purpose. In one embodiment, the number of electrical traces (whose pitch and/or size may change based on manufacturer) may include seven (7) LED cathode traces and one (1) common anode trace. In another embodiment, the number of electrical traces may be based on the type of LEDs being used. For example, if flexible element shaft 102 uses seven (7) or eight (8) RGB LEDs, then the number of electrical traces may include up to 25 traces. Additionally, it is contemplated that LED circuitry having multiple layers with traces and/or LEDs may be used. In one embodiment, surface mounted 0603 (or 0402) LEDs may be used although any type of LED suitable to the desired end result may be used. It should be appreciated that, in some embodiments, the LEDs may have a brightness of 700 MCD or greater. Moreover, it should be appreciated that in one embodiment, the processing device 112 may be any type of controller (such as for example an Atmel ATTINY2313 microcontroller) desired and suitable to the desired end result. Furthermore, the displacement device 114 may be any type displacement device suitable to the desired end purpose. For example, in one embodiment, an N20 Motor is being used and other motors (such as a K20 or K30) may be used as desired. Moreover, it should be appreciated that the POV unit 100 should be configured to operate using common batteries, such as D, C, AA, AAA and/or 9 Volt batteries.

Figure 9:
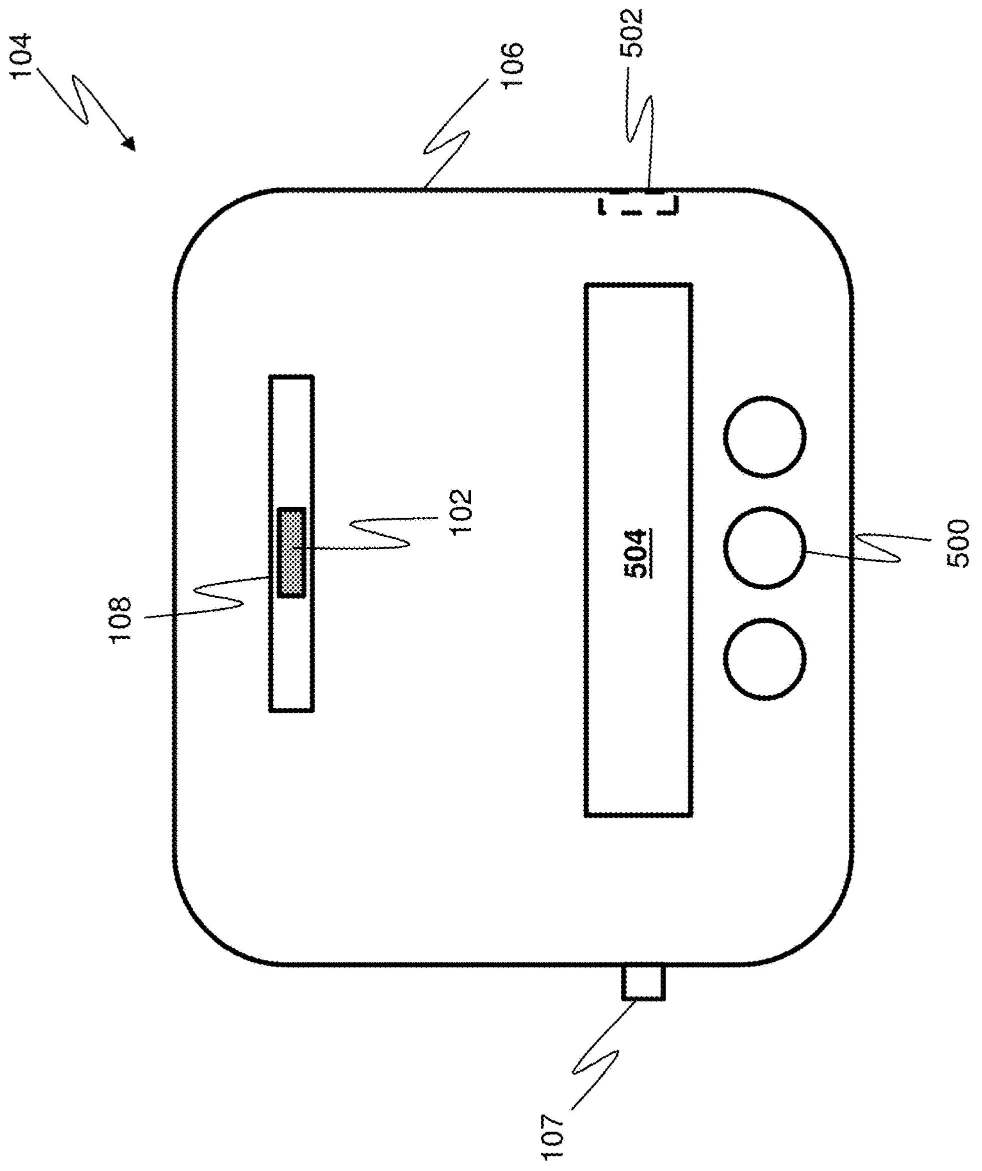
FIG. 9 is a top down view of a POV unit in accordance with another embodiment of the invention.

Referring to FIG. 9, it should be appreciated that in one embodiment, the POV unit 100 may be configured with one or more programmable buttons 500 to allow a user to program operation of the light elements 111 and/or operation of the displacement device 114. Additionally, in another embodiment the POV unit 100 may be configured to allow a user to program the processing device 112 of the POV unit 100 remotely of via a hard wired connection. For example, the POV unit 100 may include wireless capability (such as vie a Bluetooth interface) to allow a user to access and program the processing device 112 and/or the POV unit 100 may include a connection port 502 (such as for example, firewire, USB, etc . . . ) to allow a user to connect to the POV unit 100 to access and program the processing device 112 via a hardwired connection. As such, the processing device 112 may be configured to include software to engage with an external device (either remotely or via hard wire) and/or the POV unit 100 may include an output screen 504 to communicate with the user.

Moreover, while the invention has been described with reference to an exemplary embodiment, it will be understood by those skilled in the art that various changes, omissions and/or additions may be made and equivalents may be substituted for elements thereof without departing from the spirit and scope of the invention. In addition, many modifications may be made to adapt a particular situation or material to the teachings of the invention without departing from the scope thereof. Therefore, it is intended that the invention not be limited to the particular embodiment disclosed as the best mode contemplated for carrying out this invention, but that the invention will include all embodiments falling within the scope of the appended claims. Moreover, unless specifically stated any use of the terms first, second, etc. do not denote any order or importance, but rather the terms first, second, etc. are used to distinguish one element from another.

What is claimed is:

1. A Persistence Of Vision (POV) device, wherein the persistence device includes a coronal plane and a sagittal plane, the device comprising:

an element shaft, wherein the element shaft is semi-rigid in the coronal plane and includes a shaft front surface having a shaft front surface length, wherein the element shaft is flexible in the sagittal plane;

a plurality of light sources, wherein the plurality of light sources are associated with the shaft front surface and distributed along the shaft front surface length;

a processing device, wherein the processing device is communicated with the plurality of light sources to control the operation of the plurality of light sources;

a displacement device having a displacement device shaft movable in the coronal plane, wherein the element shaft is connected to the displacement device shaft such that the element shaft is movable in the coronal plane to at least partially rotate about an element shaft axis; and a device base, wherein the device base defines a base cavity for containing the processing device, the displacement device and a portion of the element shaft, wherein the device base includes a device base opening communicated with the base cavity and wherein at least a portion of the element shaft is protruding from the device base opening.

2. The device of claim 1, wherein the element shaft is connected to the displacement device shaft such that the element shaft extends out of device base opening.

3. The device of claim 1, wherein the device base opening is sized and shaped to allow the element shaft to move in the coronal plane about a sweep angle.

4. The device of claim 3, wherein the sweep angle is between about 120° and about 150°.

5. The device of claim 3, wherein the sweep angle is about 130°.

6. The device of claim 1, wherein the plurality of light sources are Light Emitting Diodes (LEDs).

7. The device of claim 1, wherein the processing device is configured to control the operation of the light sources responsive to the location of at least one of the element shaft and the light sources within the coronal plane.

8. The device of claim 1, further comprising a power source, wherein the power source is located with the base cavity and associated with at least one of the processing device, the displacement device and the light sources to power the at least one of the processing device, the displacement device and the light sources.

9. A persistence of vision device, the device comprising:

an element shaft, wherein the element shaft includes shaft front surface and a shaft length, and wherein the element shaft is semi-rigid in a coronal plane and is flexible in a sagittal plane;

at least one light source, wherein the at least one light source is associated with the shaft front surface and extends along a portion of the shaft front surface length;

a processing device, wherein the processing device is communicated with the at least one light source to control the operation of the at least one light source; and a displacement device having a displacement device shaft movable in the coronal plane, wherein the element shaft is connected to the displacement device shaft such that the element shaft is rotatably movable in the coronal plane.

10. The device of claim 9, further comprising a device base, wherein the device base defines a base cavity for containing the processing device, the displacement device and a portion of the element shaft, wherein the device base includes a device base opening communicated with the base cavity.

11. The device of claim 10, wherein the element shaft is connected to the displacement device shaft such that the element shaft extends out of device base opening.

12. The device of claim 10, wherein the device base opening is sized and shaped to allow the element shaft to move in the coronal plane about a sweep angle.

13. The device of claim 12, wherein the sweep angle is between about 120° and about 150°.

14. The device of claim 12, wherein the sweep angle is about 130°.

15. The device of claim 9, wherein the at least one light source includes a light source having a plurality of light elements.

16. The device of claim 9, wherein the at least one light source includes a one or more LED's.

17. The device of claim 9, wherein the processing device is configured to control the operation of the at least one light source responsive to the location of at least one of the element shaft and the at least one light source within the coronal plane.

18. The device of claim 10, further comprising a power source, wherein the power source is located with the base cavity and associated with at least one of the processing device, the displacement device and the light sources to power the at least one of the processing device, the displacement device and the light sources.

19. A Persistence Of Vision (POV) device, wherein the persistence device includes a coronal plane and a sagittal plane, the device comprising:

an element shaft, wherein the element shaft includes a shaft front surface having a shaft front surface length, wherein the shaft front surface is arcuate in shape along the shaft front surface length, wherein the element shaft is semi-rigid in the coronal plane and is flexible in the sagittal plane;

a plurality of light sources, wherein the plurality of light sources are associated with the shaft front surface and distributed along the shaft front surface length;

a processing device, wherein the processing device is communicated with the plurality of light sources to control the operation of the plurality of light sources; and a displacement device having a displacement device shaft movable in the coronal plane, wherein the element shaft is connected to the displacement device shaft such that the element shaft is rotatably movable in the coronal plane.

20. The device of claim 19, further comprising a device base, wherein the device base defines a base cavity for containing the processing device, the displacement device and a portion of the element shaft, wherein the device base includes a device base opening communicated with the base cavity and sized and shaped to allowing the element shaft to move in the coronal plane.

* * * * *